Aug. 27, 1957     L. STILLGEBAUER     2,804,335
SPRING-LOADED PASTRY SERVER
Filed June 25, 1953

INVENTOR.
Louis Stillgebauer
BY
ATTORNEY

United States Patent Office 2,804,335
Patented Aug. 27, 1957

2,804,335

SPRING-LOADED PASTRY SERVER

Louis Stillgebauer, Solingen, Germany

Application June 25, 1953, Serial No. 364,120

Claims priority, application Germany July 11, 1952

1 Claim. (Cl. 294—1)

This invention relates to a pastry server and has for its object to provide a spring-loaded pastry server enabling a user thereof to place the individual cut-up pieces of a pastry upon plates and the like without upsetting the cut-up pieces nor damaging them and their decorations.

Pastry servers of conventional form are generally known. It is also known that the conventional pastry servers in use at the present time are not very suitable for the purpose for which they are intended, to wit, serving of cut-up pieces of pastry. Conventional pastry servers are attended by the disadvantage that a second tool or auxiliary means such as a knife or fork is usually necessary for placing a piece of pastry on a plate without upsetting it or damaging its decorations.

It is the principal object of the present invention to eliminate the abovementioned difficulty.

To this end the invention comprises a pastry server rendering it possible to serve the individual pieces of a cut-up pastry quickly, conveniently and in a hygienically and highly satisfactory manner on a plate without it being necessary to use auxiliary means.

My pastry server is of utility in cafeterias, hotels, restaurants, clubs, private homes, etc., to wit, everywhere where pastry is served. It is apparent that it may just as well be used for serving any kind of fancy cake, pie, or tart as well as other similar food stuffs.

One embodiment of the invention is shown on the annexed drawings, in which—

Figure 2:
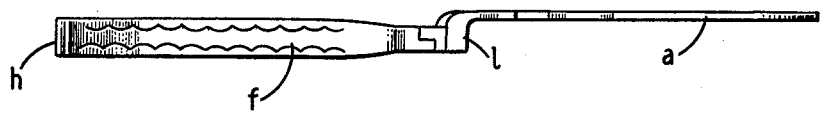
Fig. 2 is a side view of the pastry server shown in Fig. 1.

The pastry server comprises a pair of flat but relatively strong blades $a$ and $b$ which are connected by a spring handle $c$. As indicated in Fig. 2, the upper faces of the blades $a$ and $b$ are in a common plane while the handle $c$ is of U-shaped and of band-like form whose width dimension is normal to said plane.

The handle $c$ comprises opposite side portions of and an end or bight portion $h$ which normally biases the side portion $f$ laterally outwardly. The ends of said side portions $f$ opposed to said bight portion have intersecting arms $k$ and the adjacent rear ends of blades $a$ and $b$ have depending lugs or abutment $l$ which are normally engaged under the inherent resiliency of the bight portion $h$.

The blades $a$ and $b$ normally converge from the handle $c$ and their forward ends have normally abutting edges $m$.

Figure 1:
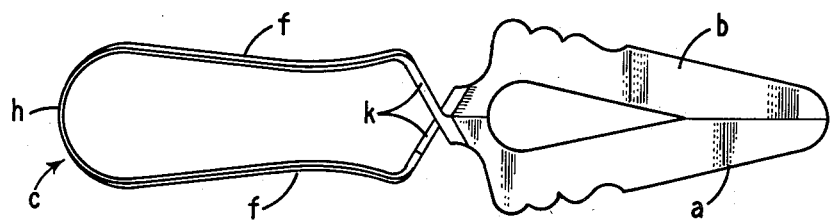
Fig. 1 is a top plan view of the pastry server provided by the invention.
Figure 3:
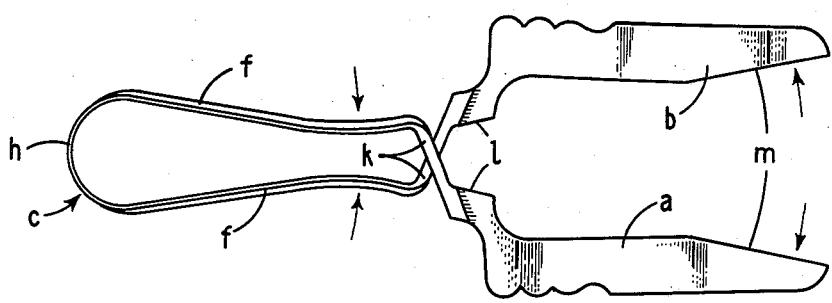
Fig. 3 is a top plan view showing the pastry server in its open, pastry-serving position.

As is clearly indicated in Figs. 1 and 3, righthand blade $a$ and lefthand side portion $f$ are unitary and disposed on opposite sides of a horizontal center line of the server which lefthand blade $b$ and righthand side portion $f$ are unitary and also disposed on opposite sides of said line.

As is indicated in Fig. 3, opposed inward pressures on the handle side portions $f$ as indicated by the arrows, result in laterally outward movement of the blades $a$ and $b$ as indicated by the arrows.

The spring force residing in the handle $c$ holds the pastry server in its closed position (Fig. 1) in which it has the form of a conventional cake or pastry server. The new pastry server according to the invention is integrally formed from a sheet metal blank.

To use the new pastry server it is pushed under a piece of cut-up pastry, then lifted up and while serving the piece of pastry on a pastry or cake plate the handle $c$ is compressed between thumb and forefinger, this opens the server as clearly shown on Fig. 3 and the piece of pastry drops gently on the plate without upsetting and without damage to itself or to its fancy decorations.

What I claim is:

A pastry server comprising an elongated generally U-shaped handle of relatively wide band form, the side portions of the handle being biased laterally outwardly by inherent resiliency in the bight portion of the handle, said side portions at their ends opposed to said bight portion being provided with intersecting arms, a flat blade connected to the outer end of each arm, said blades being in a common plane normal to the width dimension of said band form handle and converging from their connections with the arms, and said blades having normally abutting lugs at their inner ends and blunt edges adjacent their outer ends which in the normally closed position of the blades abut in a plane normal to said first plane and with respect to which latter plane the handle and blades are symmetrically disposed.

References Cited in the file of this patent

UNITED STATES PATENTS

| | | |
|---|---|---|
| 622,942 | Daudelin | Apr. 11, 1899 |
| 1,452,504 | Hadley | Apr. 24, 1923 |
| 1,514,309 | Bugg | Nov. 4, 1924 |
| 1,538,536 | Wisoff | May 19, 1925 |
| 1,634,856 | Skroch | July 5, 1927 |
| 2,010,074 | Fuerst | Aug. 6, 1935 |
| 2,304,966 | Thrower | Dec. 15, 1942 |
| 2,563,422 | Sabo | Aug. 7, 1951 |
| 2,641,496 | Benezet | June 6, 1953 |

FOREIGN PATENTS

| | | |
|---|---|---|
| 742,955 | France | Jan. 6, 1933 |